US011518406B2

(12) United States Patent
Vithaldas

(10) Patent No.: US 11,518,406 B2
(45) Date of Patent: Dec. 6, 2022

(54) TEST FAILURE DETECTION USING A GOVERNING AGENT DATA SET

(71) Applicant: TOYOTA RESEARCH INSTITUTE, INC., Los Altos, CA (US)

(72) Inventor: Sachit Vithaldas, Los Altos, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 294 days.

(21) Appl. No.: 16/838,996

(22) Filed: Apr. 2, 2020

(65) Prior Publication Data

US 2021/0309251 A1 Oct. 7, 2021

(51) Int. Cl.
   *B60W 60/00* (2020.01)
   *B60W 50/14* (2020.01)

(52) U.S. Cl.
   CPC ........ *B60W 60/0011* (2020.02); *B60W 50/14* (2013.01); *B60W 60/0015* (2020.02); *B60W 60/0025* (2020.02); *B60W 2050/143* (2013.01)

(58) Field of Classification Search
   None
   See application file for complete search history.

(56) References Cited

U.S. PATENT DOCUMENTS

| 10,346,564 | B2 | 7/2019 | Kim |
| 10,852,721 | B1 * | 12/2020 | Smith ................. G05D 1/0022 |
| 11,238,674 | B2 * | 2/2022 | Amelunxen ............. G09B 9/04 |
| 2015/0310447 | A1 | 10/2015 | Shaw |
| 2017/0132334 | A1 * | 5/2017 | Levinson ............... G01S 17/931 |
| 2018/0018411 | A1 | 1/2018 | Zhang |
| 2019/0310650 | A1 * | 10/2019 | Halder ................. G05D 1/0088 |
| 2020/0150654 | A1 * | 5/2020 | Isele ...................... G06N 3/006 |
| 2020/0310403 | A1 * | 10/2020 | Huang ................. G05D 1/0088 |
| 2021/0294944 | A1 * | 9/2021 | Nassar ................ G06F 11/3688 |

OTHER PUBLICATIONS

Wright, C. J. et al., Towards the Automatic Identification of Faulty Multi-Agent Based Simulation Runs Using MASTER, Multi-Agent-Based Simulation XIII, MABS 2012, Lecture Notes in Computer Science, vol. 7838, pp. 143-156, Springer, Berlin, Heidelberg.

* cited by examiner

*Primary Examiner* — Tamara L Weber
(74) *Attorney, Agent, or Firm* — Sheppard, Mullin, Richter & Hampton LLP; Hector A. Agdeppa; Daniel N. Yannuzzi

(57) ABSTRACT

Systems and methods for detecting out-of-bounds behavior of an agent in a simulation including multiple agents and an ego vehicle may include: providing a scenario governing behavior of an agent in the simulation; operating the simulation in accordance with the scenario across multiple occurrences; collecting data regarding behavior of the agent in the scenario for each occurrence; comparing collected data regarding behavior of the agent in the scenario with a governing data set for the scenario; and reporting an out-of-bounds condition to a system user when the results of the comparison indicate that the behavior of the agent in the scenario deviates from the agent behavior in the governing data set scenario by more than a predetermined amount.

21 Claims, 5 Drawing Sheets

TEST FAILURE DETECTION USING A GOVERNING AGENT DATA SET

TECHNICAL FIELD

The present disclosure relates generally to verifying agent behavior in simulation scenarios, and in particular, some implementations relate to use of a verified data set to verify agent behavior.

DESCRIPTION OF RELATED ART

Autonomous vehicle technology is becoming more commonplace with the introduction of new vehicles each model year. While widespread adoption of fully autonomous vehicles is only now becoming visible on the horizon, autonomous vehicle technology is gaining increasing popularity for assisted driving and other semi-autonomous vehicle operation. Developers within organizations such as major original equipment manufacturers, tier 1 suppliers and startup companies, are racing to develop autonomous vehicle and advanced driver assistance systems (ADAS) technologies.

With autonomous vehicles, robotics, and other automated systems, it may be useful to test the systems in a simulation environment with a plurality of agents. Agent-based modeling and simulation has become a popular approach to modeling autonomous vehicles and their interactions with other vehicles, pedestrians, bicycles, or other external entities. In a simulation environment, agents may be used to simulate the behavior and flow of these external entities. Agents may vary depending on the system being simulated and the environment, however, agents are generally governed by rules that define their decision-making capabilities. They may also be interactive and be designed with goal-oriented behaviors.

BRIEF SUMMARY OF THE DISCLOSURE

In the world of autonomous vehicle development, it is incredibly hard to design very concrete, reliable test cases. Frequently during development of test cases, or scenarios, for the vehicle, there are hidden implicit assumptions that may be made by authors that may not be visible at review time due to lack of knowledge of the functioning of the entire system. As development progresses the test car may behave differently, at which time it no longer obeys the implicit assumptions made by the author. Therefore, the scenario may not be capturing its original intent. Embodiments may store a baseline data set of the scenario at the time of creation. As development progresses and there's suddenly a large deviation from the baseline data set, the system flags the scenario automatically for user review. The user can choose whether to update the golden master or update the scenario.

Various embodiments of the disclosed technology relate to systems and methods for detecting out-of-bounds behavior of an agent in a simulation including multiple agents and an ego vehicle. The systems and methods may include: providing a scenario governing behavior of an agent in the simulation; operating the simulation in accordance with the scenario across multiple occurrences; collecting data regarding behavior of the agent in the scenario for each occurrence; comparing collected data regarding behavior of the agent in the scenario with a governing data set for the scenario and determining an amount of deviation between the collected data and the governing data set; and reporting an out-of-bounds condition to a system user when results of the determination indicate that the behavior of the agent in the scenario deviates from the agent behavior in the governing data set scenario by more than a predetermined amount.

A system for detecting out-of-bounds behavior of an agent in a simulation, may include: a non-transitory memory configured to store instructions; at least one processor configured to execute the instructions to: operate the simulation in accordance with the scenario across multiple occurrences; collect data regarding behavior of the agent in a scenario for each occurrence; compare collected data regarding behavior of the agent in the scenario with a governing data set for the scenario and determine an amount of deviation between the collected data and the governing data set; and report an out-of-bounds condition to a system user when results of the determination indicate that the behavior of the agent in the scenario deviates from the agent behavior in the governing data set scenario by more than a predetermined amount.

A system for detecting out-of-bounds behavior of an agent in a simulation, may include: a test system to execute the simulation in accordance with a scenario across multiple occurrences of the simulation; a data storage device to store data regarding behavior of the agent in a scenario for each occurrence; and a comparison module to: compare collected data regarding behavior of the agent in the scenario with a governing data set for the scenario and determine an amount of deviation between the collected data and the governing data set; and report an out-of-bounds condition to a system user when results of the determination indicate that the behavior of the agent in the scenario deviates from the agent behavior in the governing data set scenario by more than a predetermined amount.

The systems and methods may further include storing data collected regarding behavior of the agent in the scenario for a selected occurrence as the governing data set.

Comparing collected data with the governing data set may include comparing collected data regarding behavior of the agent in the scenario for an occurrence subsequent to the selected occurrence.

Determining an amount of deviation between the collected data and the governing data set may include measuring a difference between a data element in the collected data and a corresponding data element in the governing data set.

Determining an amount of deviation between the collected data and the governing data set may include measuring a difference between a set of data elements in the collected data and corresponding data elements in the governing data set.

Measuring the difference between the set of data elements in the collected data and corresponding data elements in the governing data set may include determining a difference between a combination of the set of data elements in the collected data and a combination of the corresponding data elements in the governing data set.

The combination of the set of data elements in the collected data and the combination of the corresponding data elements in the governing data set may be weighted combinations.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Embodiments of the systems and methods disclosed herein can provide automated systems and methods for detecting inappropriate behavior of agents in a simulation scenario utilizing multiple agents and an ego vehicle. The developer or other user may create a governing data set, or scenario, for the simulation environment. This can be based on information or other data about the system being tested (e.g., rules and operating parameters relating to the simulation environment) as well as information and other data about the agents to be used in the simulation. Systems and methods may be configured to collect data regarding the movement of an agent in a simulation scenario. The data collected may be compared with results using the governing data set for that agent. If there is a sufficient difference between the (e.g., above a determined threshold) data collected during simulation as compared to the governing data set, then the test scenario flagged as being out-of-bounds. This can be flagged to the developer or other user who may determine whether to update the governing data set or to update the test scenario.

The systems and methods disclosed herein may be implemented for simulations with any of a number of different autonomous or semi-autonomous vehicles as ego vehicles. For example, the systems and methods disclosed herein may be used for simulations with cars, trucks, buses, construction vehicles and other on- and off-road vehicles. These can include vehicles for transportation of people/personnel, materials or other items. In addition, the technology disclosed herein may also extend to other vehicle types as well. An example Autonomous Vehicle (AV) for which embodiments of the disclosed technology may be implemented is illustrated in FIG. 1.

Figure 1:
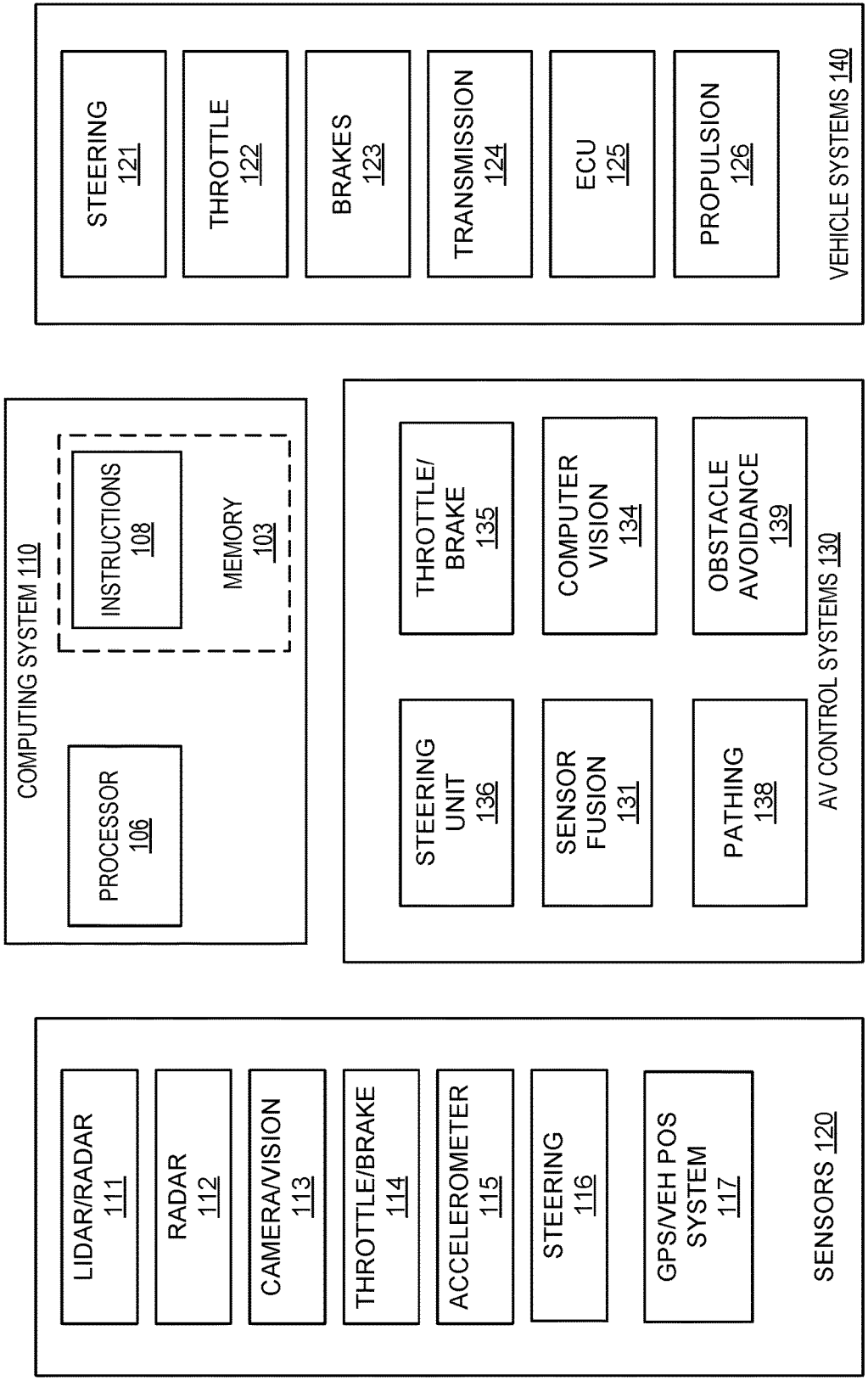
FIG. 1 illustrates an example autonomous or semi-autonomous vehicle with which embodiments of the disclosed technology may be implemented.

FIG. 1 illustrates an example autonomous or semi-autonomous vehicle with which embodiments of the disclosed technology may be implemented. In this example, vehicle 100 includes a computing system 110, sensors 120, AV control systems, 130 and vehicle systems 140. Vehicle 100 may include a greater or fewer quantity of systems and subsystems and each could include multiple elements. Accordingly, one or more of the functions of the technology disclosed herein may be divided into additional functional or physical components, or combined into fewer functional or physical components. Additionally, although the systems and subsystems illustrated in FIG. 1 are shown as being partitioned in a particular way, the functions of vehicle 100 can be partitioned in other ways. For example, various vehicle systems and subsystems can be combined in different ways to share functionality.

Sensors 120 may include a plurality of different sensors to gather data regarding vehicle 100, its operator, its operation and its surrounding environment. In this example, sensors 120 include lidar 111, radar 112, or other like the distance measurement sensors, image sensors 113, throttle and brake sensors 114, 3D accelerometers 115, steering sensors 116, and a GPS or other vehicle positioning system 117. Distance measuring sensors such as lidar 111, radar 112, IR sensors and other like sensors can be used to gather data to measure distances and closing rates to various external objects such as other vehicles, traffic signs, pedestrians, light poles and other objects. Image sensors 113 can include one or more cameras or other image sensors to capture images of the environment around the vehicle as well as internal to the vehicle. Information from image sensors 113 can be used to determine information about the environment surrounding the vehicle 100 including, for example, information regarding other objects surrounding vehicle 100. For example, image sensors 113 may be able to recognize landmarks or other features (including, e.g., street signs, traffic lights, etc.), slope of the road, lines on the road, curbs, objects to be avoided (e.g., other vehicles, pedestrians, bicyclists, etc.) and other landmarks or features. Information from image sensors 113 can be used in conjunction with other information such as map data or information from positioning system 117 to determine, refine or verify vehicle location.

Throttle and brake sensors 114 can be used to gather data regarding throttle and brake application by a human or autonomous operator. Accelerometer 115 may include a 3D accelerometer to measure roll, pitch and yaw of the vehicle. Accelerometer 115 may include any combination of accelerometers and gyroscopes for the vehicle or any of a number of systems or subsystems within the vehicle to sense position and orientation changes based on inertia.

Steering sensors 116 can be included to gather data regarding steering input for the vehicle by a human or autonomous operator, and vehicle positioning system 117 (e.g., GPS or other positioning system) can be used to gather position information about a current location of the vehicle as well as other positioning or navigation information. Although not illustrated, other sensors 120 may be included as well.

Although not illustrated, other sensors 120 may be provided as well. Various sensors 120 may be used to provide input to computing system 110 and other systems of vehicle 100 so that the systems have information useful to operate in an autonomous, semi-autonomous or manual mode.

AV control systems 130 may include a plurality of different systems/subsystems to control operation of vehicle 100. In this example, AV control systems 130 include steering unit 136, throttle and brake control unit 135, sensor fusion module 131, computer vision module 134, pathing module 138, and obstacle avoidance module 139. Sensor fusion module 131 can be included to evaluate data from a plurality of sensors, including sensors 120. Sensor fusion module 131 may use computing system 110 or its own computing system to execute algorithms to assess inputs from the various sensors.

Throttle and brake control unit 135 can be used to control actuation of throttle and braking mechanisms of the vehicle to accelerate, slow down, stop or otherwise adjust the speed of the vehicle. For example, the throttle unit can control the operating speed of the engine or motor used to provide motive power for the vehicle. Likewise, the brake unit can be used to actuate brakes (e.g, disk, drum, etc.) or engage regenerative braking (e.g., such as in a hybrid or electric vehicle) to slow or stop the vehicle.

Steering unit 136 may include any of a number of different mechanisms to control or alter the heading of the vehicle. For example, steering unit 136 may include the appropriate control mechanisms to adjust the orientation of the front or rear wheels of the vehicle to accomplish changes in direction of the vehicle during operation. Electronic, hydraulic, mechanical or other steering mechanisms may be controlled by steering unit 136.

Computer vision module 134 may be included to process image data (e.g., image data captured from image sensors 113, or other image data) to evaluate the environment within or surrounding the vehicle. For example, algorithms operating as part of computer vision module 134 can evaluate still or moving images to determine features and landmarks (e.g., road signs, traffic lights, lane markings and other road boundaries, etc.), obstacles (e.g., pedestrians, bicyclists, other vehicles, other obstructions in the path of the subject vehicle) and other objects. The system can include video tracking and other algorithms to recognize objects such as the foregoing, estimate their speed, map the surroundings, and so on.

Pathing module 138 may be included to compute a desired path for vehicle 100 based on input from various other sensors and systems. For example, pathing module 138 can use information from positioning system 117, sensor fusion module 131, computer vision module 134, obstacle avoidance module 139 (described below) and other systems to determine a safe path to navigate the vehicle along a segment of a desired route. Pathing module 138 may also be configured to dynamically update the vehicle path as real-time information is received from sensors 120 and other control systems 130.

Obstacle avoidance module 139 can be included to determine control inputs necessary to avoid obstacles detected by sensors 120 or AV control systems 130. Obstacle avoidance module 139 can work in conjunction with pathing module 138 to determine an appropriate path to avoid a detected obstacle.

Vehicle systems 140 may include a plurality of different systems/subsystems to control operation of vehicle 100. In this example, AV control systems 130 include steering system 121, throttle system 122, brakes 123, transmission went 24, electronic control unit (ECU) 125 and propulsion system 126. These vehicle systems 140 may be controlled by AV control systems 130 in autonomous, semi-autonomous or manual mode. For example, in autonomous or semi-autonomous mode, AV control systems 130, alone or in conjunction with other systems, can control vehicle systems 140 to operate the vehicle in a fully or semi-autonomous fashion. This may also include an assist mode in which the vehicle takes over partial control or activates ADAS controls to assist the driver with vehicle operation.

Computing system 110 in the illustrated example includes a processor 106, and memory 103. Some or all of the functions of vehicle 100 may be controlled by computing system 110. Processor 106 can include one or more GPUs, CPUs, microprocessors or any other suitable processing system. Processor 106 may include one or more single core or multicore processors. Processor 106 executes instructions 108 stored in a non-transitory computer readable medium, such as memory 103.

Memory 103 may contain instructions (e.g., program logic) executable by processor 106 to execute various functions of vehicle 100, including those of vehicle systems and subsystems. Memory 103 may contain additional instructions as well, including instructions to transmit data to, receive data from, interact with, and/or control one or more of the sensors 120, AV control systems, 130 and vehicle systems 140. In addition to the instructions, memory 103 may store data and other information used by the vehicle and its systems and subsystems for operation, including operation of vehicle 100 in the autonomous, semi-autonomous or manual modes.

Although one computing system 110 is illustrated in FIG. 1, in various embodiments multiple computing systems 110 can be included. Additionally, one or more systems and subsystems of vehicle 100 can include its own dedicated or shared computing system 110, or a variant thereof. Accordingly, although computing system 110 is illustrated as a discrete computing system, this is for ease of illustration only, and computing system 110 can be distributed among various vehicle systems or components.

Vehicle 100 may also include a wireless communication system (not illustrated) to communicate with other vehicles, infrastructure elements, cloud components and other external entities using any of a number of communication protocols including, for example, V2V, V2I and V2X protocols. Such a wireless communication system may allow vehicle 100 to receive information from other objects including, for example, map data, data regarding infrastructure elements, data regarding operation and intention of surrounding vehicles, and so on. A wireless communication system may also allow vehicle 100 to transmit information to other objects. In some applications, computing functions for various embodiments disclosed herein may be performed entirely on computing system 110, distributed among two or more computing systems 110 of vehicle 100, performed on a cloud-based platform, performed on an edge-based platform, or performed on a combination of the foregoing.

The example of FIG. 1 is provided for illustration purposes only as one example of an ego vehicle for which embodiments of the disclosed technology may be implemented. One of ordinary skill in the art reading this description will understand how the disclosed embodiments can be implemented with this and other vehicle platforms.

Autonomous vehicle software is typically assessed using testing methods to test the operation of the vehicle in simulated real-world scenarios, including interactions between the subject vehicle and other vehicles in the operating environment. The subject vehicle is referred to as the ego vehicle and the surrounding vehicles are referred to as agents. Agents are not limited to surrounding vehicles, and may also include pedestrians, bicycles, and other fixed or moving objects in the environment of the ego vehicle.

Figure 2:
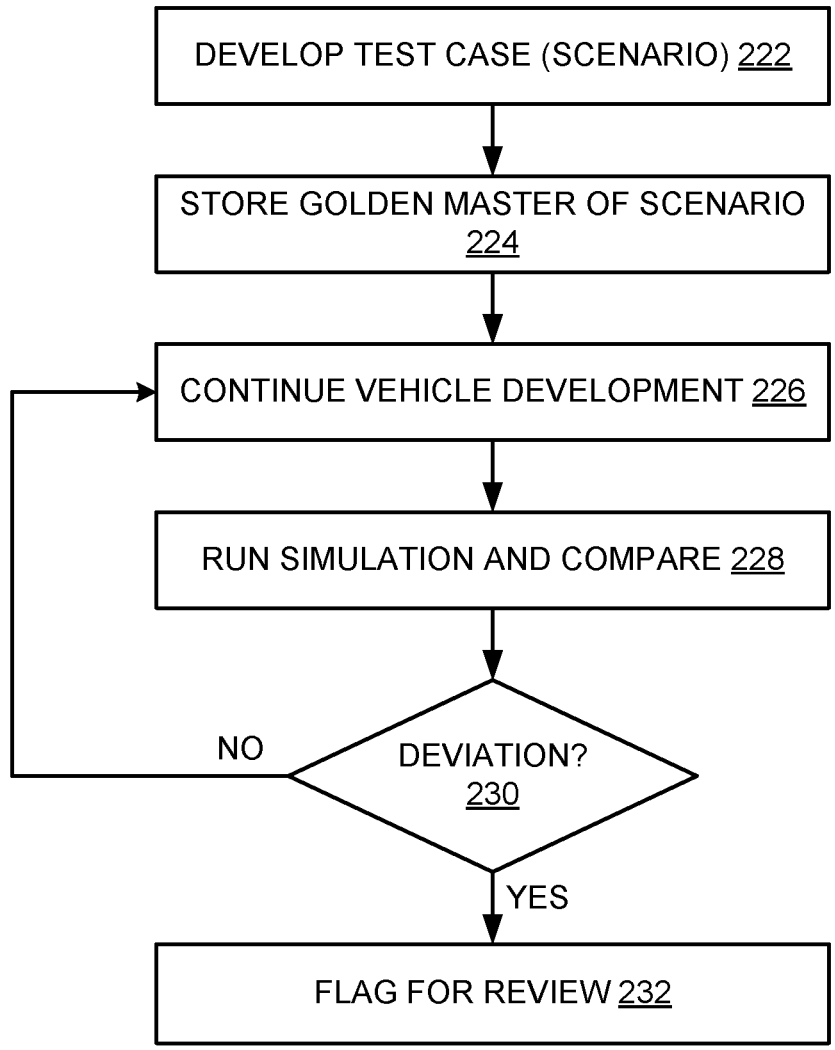
FIG. 2 illustrates an example process for test failure detection using a global data set in accordance with various embodiments.

FIG. 2 is a diagram illustrating an example process for test failure detection using a global data set in accordance with various embodiments. Referring now to FIG. 2, at operation 222, simulation developers develop a test case, or scenario, to be used for a simulation. This can be used, for example, as a simulation of autonomous vehicle software. The scenario can include a number of agents to be used in the simulation and their behavior. An objective of the test case can be to ensure that the ego vehicle software meets specified software requirements for safe operation. In other words, an objective can be to ensure that the ego vehicle performs as expected and otherwise in a safe manner. For example, a test case can be designed to test lane-change operations for an autonomous vehicle. In this example, the test case can be used to ensure that the autonomous vehicle software causes the autonomous vehicle to perform safe lane changes in different traffic scenarios and in various operating environments.

The test case may generally include initial conditions for vehicle operation, vehicle parameters and other vehicle information. The test case may also include a set of possible faults that may occur. The test case may also include a plurality of agents with which the ego vehicle is intended to operate. Accordingly, the ego vehicle can be tested in simulated real-world scenarios with surrounding actors such that ego vehicle performance can be fully evaluated. It may also be desired that the agents perform predictably in the simulation and that they can be plugged in to multiple simulations with predictable behavior. In many implementations, developers may develop a plurality of test cases, or scenarios, for different operational scenarios or requirements.

At operation 224, the test case is run through a simulation system and a governing data set is created. The governing data set is created as a result of applying the test case created using the initial test case data to the simulation system. The output of the simulation system can include a data set of agent performance. One or more of the agents can be profiled in the data set so that their performance can be characterized. For instance, in the example of lane change operations, the data set output from the simulation system can include details on the performance and behavior of one or more of the agents in the environment of the ego vehicle executing the lane-change operations. The output of the simulation system may also include a data set of ego vehicle performance in the simulation.

This data set created using the test scenario can be stored as a baseline or governing data set. This governing data set can include data indicating expected performance of one or more of the agents in the simulation. At operation 226, vehicle developers continue vehicle development. For example, autonomous vehicle software can be created or revised for the subject vehicle or vehicles under development. As a result, vehicle performance characteristics may change as may vehicle requirements. For example, vehicle characteristics such as maximum speed, maximum speed under certain conditions, acceleration rates, deceleration rates, vehicle dimensions, maximum lateral acceleration and so on. For example, at the time of the creation of a test, the test vehicle may have been limited to driving up to 35 mph. Accordingly, in this example the scenario was designed such that an agent is permitted to cut ahead of the test vehicle at 35 mph because it was implicitly assumed that the test vehicle travels at or near 35 mph. At a later time, the test vehicle can now travel at 40 mph. As a result the scenario no longer captures the original intent, since the test vehicle is going 40 mph instead of 35 mph. Agent behavior in this circumstance could result in erroneous outcomes.

At operation 228, the vehicle developers run the simulation using the test scenario to test the subject system. The test system generates output data indicating agent performance and behavior during the simulation. At operation 230, the system determines whether there is a deviation between the output data generated by running the test scenario in the simulation system in real time, and the baseline data set generated and stored using the original test scenario at operation 224. In other words, the system determines whether agent behavior in the simulation run is consistent with agent behavior from the baseline data set. The system can determine whether the deviation, if any, is within a predefined deviation threshold. For example, the system can look at various data items in the data set to determine how much they diverge. The system can look at divergence of individual data elements, or it can look at combined divergence across a plurality of data elements for an agent. Combined divergence, for example, may look at the average divergence across all data elements, or a subset of data elements. In such combinations, individual data items can be weighted based on importance.

For example, the system can determine the deviation between the collected data and the governing data set by measuring a difference between a set of data elements in the collected data and corresponding data elements in the governing data set. The difference between the set of data elements in the collected data and corresponding data elements in the governing data may be determined as the difference between a weighted or unweighted combination of the set of data elements in the collected data and a weighted or unweighted combination of the corresponding data elements in the governing data set.

Consider an example scenario of a left turn at an intersection. Operational parameters (e.g., agent rules) may govern behavior of agents approaching an intersection where the ego vehicle is expected to make a left-hand turn across traffic. A more aggressive ego vehicle maneuver will result in certain reactionary behavior by an agent and this may be a deviation from agent behavior in the baseline simulation. If the deviation is not above a predetermined threshold, operations continue such as, for example, at operation 226. If the deviation is greater than a predetermined threshold, at operation 232 the test scenario can be flagged for review. If flagged for review, system developers can review the output and determine whether the test scenario or the simulation should be updated.

Figure 3:
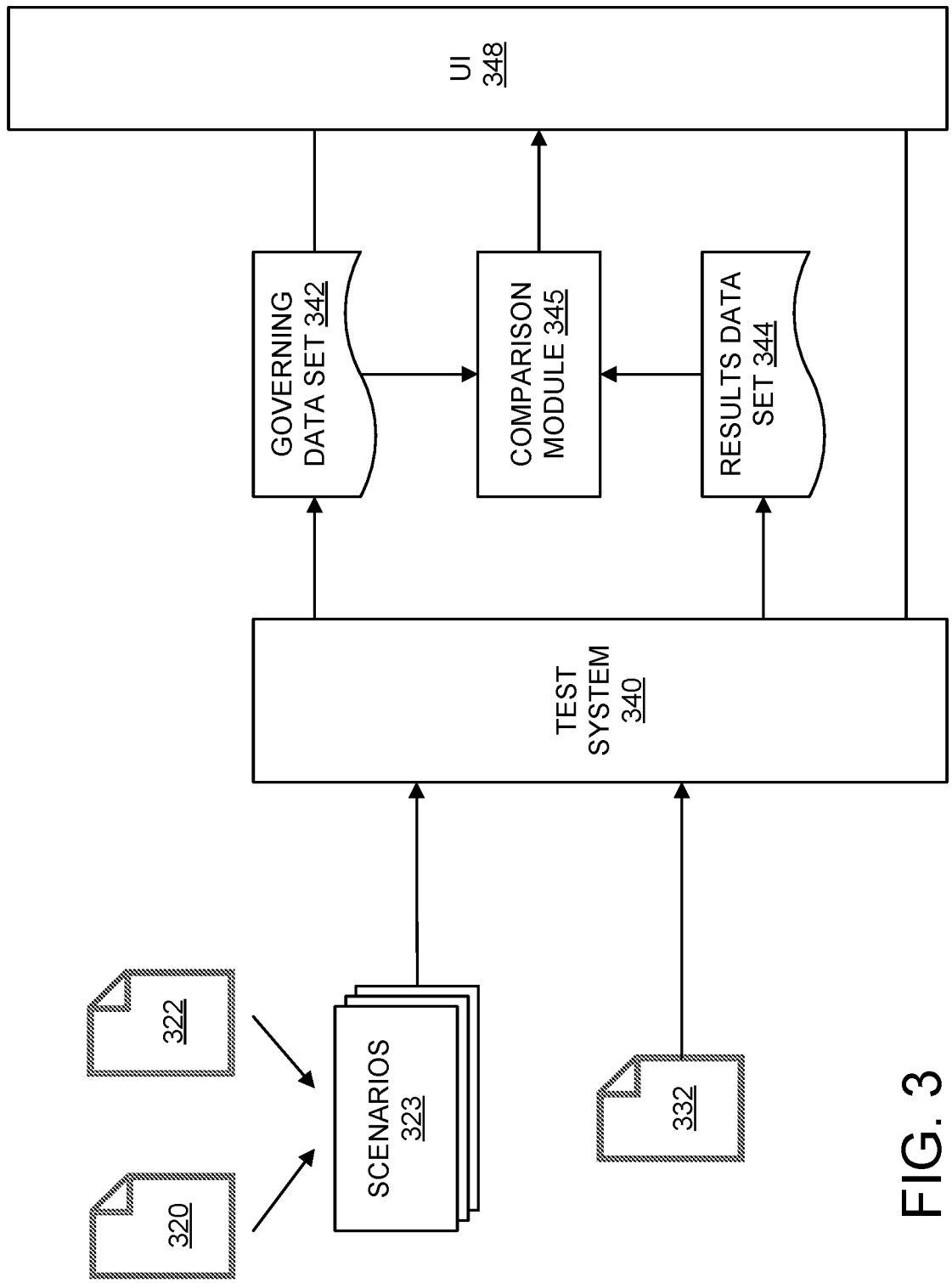
FIG. 3 illustrates an example system for test failure detection in accordance with various embodiments.

FIG. 3 illustrates an example system for test failure detection in accordance with some embodiments. This example includes a test system 340 to test autonomous vehicle software components, a comparison module 345 to compare test results with the governing data set, and a user interface 348 to allow user interaction with the system. As seen in the example of FIG. 3, developers may prepare a plurality of tests or operational scenarios 323. These various scenarios 323 can be created to test a number of different vehicle systems or operational aspects. As noted above, in one example a scenario 323 can be created to test lane change maneuvers for the autonomous vehicle. Scenarios 323 can include a plurality of agents with which the ego vehicle can be operated in the simulation environment to test the performance of the ego vehicle in simulated operating conditions with other vehicles and actors (agents). Scenarios 323 can be created using data from a variety of sources, including requirements data 322 and environment data 320. Requirements data 322 can include rules, specifications and other information used to create a particular scenario. environment data 320 may include information about the environment surrounding the ego vehicle for simulation, including agents.

Scenarios 323 can be created using data from a variety of sources, including requirements data 322 and environment data 320. Requirements data 322 can include rules, specifications and other information used to create a particular scenario.

Test system 340 includes a simulation system configured to execute scenarios 323 to simulate operation of a subject vehicle in the operational scenario to be tested. Vehicle data 332 provides operational and performance data for the subject vehicle under test. Test system 340 applies the subject vehicle (represented by vehicle data 332) to the chosen scenario 323 to run the simulation on the vehicle. The simulation can be used to evaluate the performance of one or more vehicle systems (e.g., autonomous vehicle software) within the provided scenario. Continuing with the above example of evaluating lane change performance, test system 340 can execute a scenario 323 to perform lane change maneuvers for the subject vehicle in a defined environment with a number of simulated agents.

The first time a scenario 323 is executed in the test system 340 with subject vehicle data 332, the resulting data set output by test system 340 is stored as governing data set 342. Governing data set 342 provides a baseline for the scenario. Additionally, a new governing data set 342 can be stored periodically to provide an updated governing data set 342.

On subsequent runs of a scenario 323 through test system 340, the resulting data set can be output by test system 340 as results data set 344. Comparison module 345 can be used to compare results data set 344 with the baseline data set 342 to determine whether there is variation or deviation between the results. For example, various data elements created by test system 340 can be compared to determine whether they are diversion as between results data set 344 and governing data set 342. For example, the behavior of agents during the simulation can be output as part of the data from test system 340. The behavior of one or more agents in a given simulation (as part of results data set 344) can be compared against the behavior of the same agent or agents when the baseline simulation was run (as part of governing data set 342). If the results are inconsistent, a system operator can be informed such as via user interface 348. The results may be deemed inconsistent, for example, if the behavior of an agent in a simulation is different from the behavior of the same agent during the baseline simulation as determined by their respective data sets 342, 344. Depending on the results, the user may update governing data set 342 or the user may update the appropriate scenario 323.

The user can review the data and the differences to determine whether there is a test failure. For example, changes to the ego vehicle parameters manifested in vehicle data 332 may result in simulation errors or changes. For example, changes in ego vehicle speed or maneuvering may affect how agents behave around the ego vehicle. This might be caused by rules governing agent behavior (such as to avoid the ego vehicle under certain circumstances, but not under other circumstances). For example, consider a scenario in which an agent is supposed to slow down drastically in front of an ego vehicle when it makes a lane change. Further consider that changes in the ego vehicle software have the result that the ego vehicle no longer makes this lane change. As a result, the ado vehicle will never slow down. Divergent results as between results data set 344 and baseline data set 342 may highlight this change in agent behavior.

Figure 4:
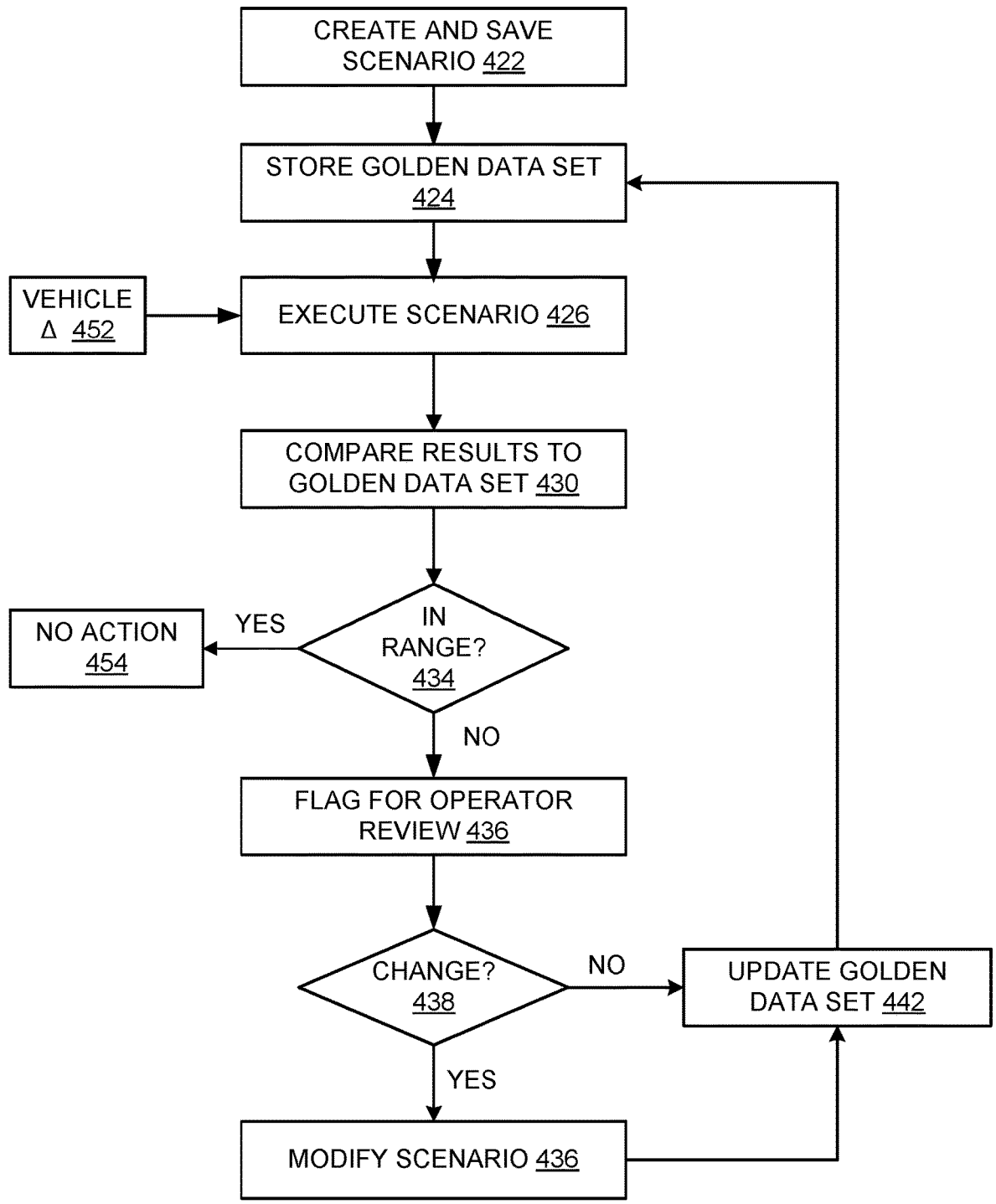
FIG. 4 illustrates an example process for test failure detection in accordance with various embodiments.

FIG. 4 illustrates an example process for test failure detection in accordance with some embodiments. With reference now to FIG. 4, at operation 422 an operator creates and saves a test case or a scenario (e.g., scenario 323) including one or more agents with which ego vehicle simulations can be run. As noted above, agents can include other vehicles, pedestrians, trains (e.g., at crossings) and so on. Agents may be programmed to react to other agents, the ego vehicle and to the computational environment in which it is located. Agents can rely on behavior rules including those ranging from basic reaction decision rules to complex adaptive artificial intelligence. These rules can govern the agents' behaviors and decision-making capabilities. Agent behavior can be based on stochastic elements and distributions of parameters that may affect safety relevant situations (e.g., time-to-collision distributions). Agents may operate according to protocols for interacting with the ego vehicle and with other agents, and can include the ability to communicate and to respond to the environment. For example, agent speed determinants can include surrounding cars, traffic lights, existence and placement of pedestrians, a forward intersection situation, and other traffic conditions. Virtual preceding and surrounding cars and the behavior of the ego vehicle can affect behavior of a given agent. Agents may also function somewhat independently in their environment and in their dealings with other agents, at least over a limited or defined range of situations. Accordingly, agent behavior can vary from one simulation run to the next, and these variations can be affected by changes in the ego vehicle.

At operation 424, the operator runs the created scenario through a simulation system (e.g., test system 340) for a subject vehicle to test one or more software components under development for the subject vehicle. This creates a data set as an output of the test system and the data set is stored as a baseline data set (e.g., governing data set 342) for the scenario. The governing data set can include the behavior of agents in the simulation run.

At operation 426, for ongoing simulation operations the system executes the created scenario for the ego vehicle. The scenario can be used for multiple simulations as development of systems for the subject vehicle continues. Changes to the subject vehicle systems, illustrated at 452, are applied to the simulations as appropriate. This may change behavior of the ego vehicle during simulations, which can in turn affect behavior of the agents.

For each simulation run, the test data is created (e.g., results data set 344). The test data can be compared to the baseline data set to determine whether the behavior of the agents is consistent with past agent behavior as captured in the baseline data set. This is illustrated at operation 434. In the example described above with reference to FIG. 3, this comparison can be performed by a comparison module 345. Consistency of behavior can be determined by comparing agent data from the simulation with data for that agent in the baseline to determine an amount of deviation between the data. If behavior of the agents in a simulation run is consistent with behavior of the agents in the baseline run, no further action is required (illustrated at 454) and simulation operations may continue.

On the other hand, if the results are not within an acceptable range, at operation 436 the system flags the results for operator review. Upon review, the operator can determine at operation 438 whether or not changes are required based on the results. If no changes required, the operator may update the governing data set as appropriate. This is illustrated at operation 442. For example, the system user might use data from the resulting data set to update data in the baseline data set. This might occur where the system user determines that the resulting data reflects more appropriate agent behavior for simulations.

If the operator does determine at operation 438 that a change is required, the operator may modify the subject scenario to account for the differences. The scenario might be changed, for example, to apply new rules for agent behavior. For example, the operator may redesign the scenario from scratch or make minor changes to the ado agents to adjust for new desired behaviors. A simulation can be run using the updated scenario to create a new baseline data set at operation 442. The new baseline data set can once again be stored for future comparisons.

Figure 5:
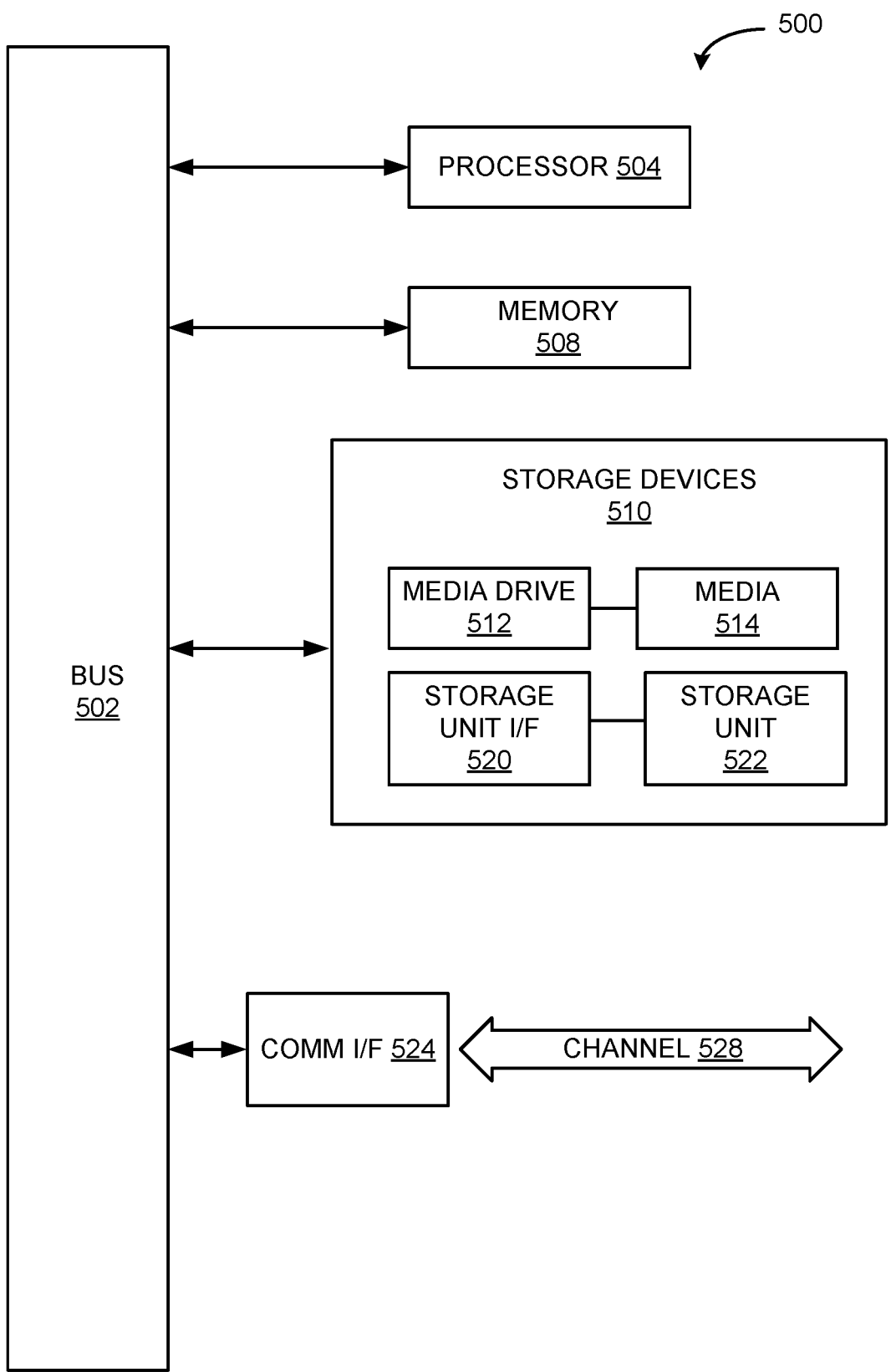
FIG. 5 is an example computing component that may be used to implement various features of embodiments described in the present disclosure.

As used herein, the term module may be used to describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. Various components described herein may be implemented as discrete modules for described functions and features can be shared in part or in total among one or more modules. In other words, as would be apparent to one of ordinary skill in the art after reading this description, the various features and functionality described herein may be implemented in any given application. They can be implemented in one or more separate or shared modules in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where modules are implemented in whole or in part using software, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the application using other computing components or architectures.

Referring now to FIG. 5, computing component 500 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid-state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and a storage unit interface 520. Examples of such storage units 522 and storage unit interfaces 520 can include a program cartridge and cartridge interface, a removable memory (for example, a flash memory or other removable memory component) and memory slot. Other examples may include a PCMCIA slot and card, and other fixed or removable storage units 522 and storage unit interface 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (for example, Ethernet, network interface card, IEEE 802.XX or other interface). Other examples include a communications port (for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 522, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for detecting out-of-bounds behavior of an agent in a simulation including multiple agents and an ego vehicle, the method comprising:
   providing a scenario governing behavior of an agent in the simulation;
   operating the simulation in accordance with the scenario across multiple occurrences;
   collecting data regarding behavior of the agent in the scenario for each occurrence;
   comparing collected data regarding behavior of the agent in the scenario with a governing data set for the scenario and, based on the comparison, determining an amount of deviation between the collected data and the governing data set; and
   reporting an out-of-bounds condition to a system user when results of the determination indicate that the behavior of the agent in the scenario deviates from the agent behavior in the governing data set scenario by more than a predetermined amount.

2. The method of claim 1, further comprising storing data collected regarding behavior of the agent in the scenario for a selected occurrence as the governing data set.

3. The method of claim 1, wherein comparing collected data with the governing data set comprises comparing collected data regarding behavior of the agent in the scenario for an occurrence subsequent to the selected occurrence.

4. The method of claim 1, wherein determining an amount of deviation between the collected data and the governing data set comprises measuring a difference between a data element in the collected data and a corresponding data element in the governing data set.

5. The method of claim 1, wherein determining an amount of deviation between the collected data and the governing data set comprises measuring a difference between a set of data elements in the collected data and corresponding data elements in the governing data set.

6. The method of claim 5, wherein measuring the difference between the set of data elements in the collected data and corresponding data elements in the governing data set comprises determining a difference between a combination of the set of data elements in the collected data and a combination of the corresponding data elements in the governing data set.

7. The method of claim 6, wherein the combination of the set of data elements in the collected data and the combination of the corresponding data elements in the governing data set are weighted combinations.

8. A system for detecting out-of-bounds behavior of an agent in a simulation, the system comprising:
   a non-transitory memory configured to store instructions;
   at least one processor configured to execute the instructions to:
     operate the simulation in accordance with a scenario across multiple occurrences;
     collect data regarding behavior of the agent in a scenario for each occurrence;
     compare collected data regarding behavior of the agent in the scenario with a governing data set for the scenario and, based on the comparison, determine an amount of deviation between the collected data and the governing data set; and
     report an out-of-bounds condition to a system user when results of the determination indicate that the behavior of the agent in the scenario deviates from the agent behavior in the governing data set scenario by more than a predetermined amount.

9. The system of claim 8, further comprising storing data collected regarding behavior of the agent in the scenario for a selected occurrence as the governing data set.

10. The system of claim 9, wherein comparing collected data with the governing data set comprises comparing collected data regarding behavior of the agent in the scenario for an occurrence subsequent to the selected occurrence.

11. The system of claim 8, wherein determining an amount of deviation between the collected data and the governing data set comprises measuring a difference between a data element in the collected data and a corresponding data element in the governing data set.

12. The system of claim 8, wherein determining an amount of deviation between the collected data and the governing data set comprises measuring a difference between a set of data elements in the collected data and corresponding data elements in the governing data set.

13. The system of claim 12, wherein measuring the difference between the set of data elements in the collected data and corresponding data elements in the governing data set comprises determining a difference between a combination of the set of data elements in the collected data and a combination of the corresponding data elements in the governing data set.

14. The system of claim 13, wherein the combination of the set of data elements in the collected data and the combination of the corresponding data elements in the governing data set are weighted combinations.

15. A system for detecting out-of-bounds behavior of an agent in a simulation, the system comprising a non-transitory computer-readable storage medium including instructions that, when executed by at least one processor, cause the processor to:

execute the simulation in accordance with a scenario across multiple occurrences of the simulation;

store data regarding behavior of the agent in a scenario for each occurrence;

compare collected data regarding behavior of the agent in the scenario with a governing data set for the scenario and, based on the comparison, determine an amount of deviation between the collected data and the governing data set; and report an out-of-bounds condition to a system user when results of the determination indicate that the behavior of the agent in the scenario deviates from the agent behavior in the governing data set scenario by more than a predetermined amount.

16. The system of claim 15, wherein the non-transitory computer-readable storage medium includes further instructions that cause the processor to store data collected regarding behavior of the agent in the scenario for a selected occurrence as the governing data set.

17. The system of claim 16, wherein comparing collected data with the governing data set comprises comparing collected data regarding behavior of the agent in the scenario for an occurrence subsequent to the selected occurrence.

18. The system of claim 15, wherein determining an amount of deviation between the collected data and the governing data set comprises measuring a difference between a data element in the collected data and a corresponding data element in the governing data set.

19. The system of claim 15, wherein determining an amount of deviation between the collected data and the governing data set comprises measuring a difference between a set of data elements in the collected data and corresponding data elements in the governing data set.

20. The system of claim 19, wherein measuring the difference between the set of data elements in the collected data and corresponding data elements in the governing data set comprises determining a difference between a combination of the set of data elements in the collected data and a combination of the corresponding data elements in the governing data set.

21. The system of claim 20, wherein the combination of the set of data elements in the collected data and the combination of the corresponding data elements in the governing data set are weighted combinations.

\* \* \* \* \*